United States Patent [19]

Schneider et al.

[11] Patent Number: 4,688,307

[45] Date of Patent: Aug. 25, 1987

[54] MEASURING INSTRUMENT WITH PROVISION FOR INTERCHANGEABLE HOLDING OF PROBE PINS AND FOR THEIR RETRIEVAL FROM MAGAZINE STORAGE

[75] Inventors: Horst Schneider, Königsbronn; Rainer Zeeh, Heidenheim/Brenz; Hans J. Neumann, Oberkochen, all of Fed. Rep. of Germany

[73] Assignee: Carl-Zeiss-Stiftung, Heidenheim/Brenz, Fed. Rep. of Germany

[21] Appl. No.: 927,717

[22] Filed: Nov. 7, 1986

Related U.S. Application Data

[63] Continuation of Ser. No. 615,837, May 31, 1984, Pat. No. 4,637,119.

[30] Foreign Application Priority Data

Jun. 3, 1983 [DE] Fed. Rep. of Germany ....... 3320127

[51] Int. Cl.⁴ .............................................. B23Q 3/155
[52] U.S. Cl. ........................................ 29/26 A; 29/568
[58] Field of Search ............. 29/568, 26 A; 33/172 E, 33/559, 561, 558; 409/126, 127; 408/31, 35

[56] References Cited

U.S. PATENT DOCUMENTS 4,145,802  3/1979  d'Auria ................................. 29/568
4,349,946  9/1982  McMurtry ............................... 29/57
4,358,888  11/1982  Zankl et al. ........................... 29/568
4,499,650  2/1985  Cannon et al. ......................... 29/568

*Primary Examiner*—Gil Weidenfeld
*Assistant Examiner*—Daniel W. Howell
*Attorney, Agent, or Firm*—Hopgood, Calimafde, Kalil, Blaustein & Judlowe

[57] ABSTRACT

The invention concerns a receiver (1) in the probe head of a multiple-coordinate measuring machine in which probe-pin combinations (21) can be replaceably chucked with high precision with respect to their position in space. The receiver contains an isostatic three-point support (14) against which the base (15, 16, 17, 18, 19) of the probe-pin combination is drawn by an electrically operated clamping device. The clamping device is coupled with the control computer of the measuring machine so that a probe change can be effected automatically.

In a preferred embodiment, the clamping device consists of a permanent magnet (11) and of an electromagnet (10) by which the field of the permanent magnet (11) can be selectively counteracted or increased to achieve pick-up and release functions. In another embodiment, a motor-driven screw thread performs the pick-up and release functions, and assures that the picked-up probe will unambiguously be drawn into correct isostatic engagement with the three-point support.

7 Claims, 6 Drawing Figures

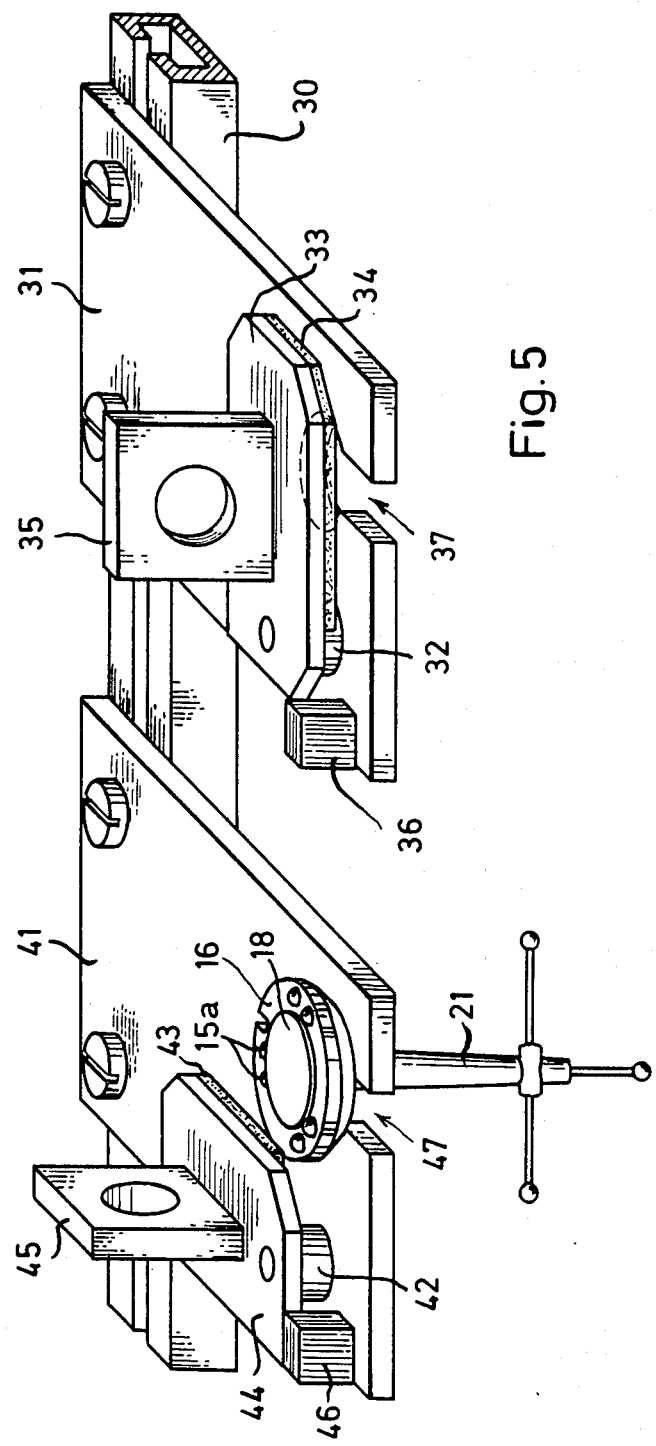

MEASURING INSTRUMENT WITH PROVISION FOR INTERCHANGEABLE HOLDING OF PROBE PINS AND FOR THEIR RETRIEVAL FROM MAGAZINE STORAGE

This is a continuation of copending application Ser. No. 615,837, filed May 31, 1984 now U.S. Pat. No. 4,637,119.

BACKGROUND OF THE INVENTION

The present invention relates to a receiver or chucking device for the interchangeable attachment of a work-contacting probe pin or probe-pin combination to the probe head of a coordinate-measuring instrument. Such devices are intended to permit the fastest and easiest possible chucking of the probepin combination necessary for a specific measurement task.

Until now, it has been customary, in a manual operation, to screw or clamp the probe pin into the probe head. However, this manual operation is disadvantageous in the case of large-scale automatically controlled measurement processes, since it requires an operator whose sole purpose is to replace probe pins at relatively long intervals of time.

A measurement method is known from "American Machinist", October 1982, pages 152–153, in which the measurement machine itself changes the probe, under computer control. However, that reference does not show how to provide a chucking device for fastening the probe to the machine; in any event, this known automatic change method requires calibration of probe pins after each change, thereby slowing the measurement process.

British Pat. No. 1,599,751 discloses a receiver for replaceable attachment of a complete probe head to the measuring spindle of a measurement machine. This receiver consists of a three-point support on the measurement spindle, and the feeler head is drawn against the three-point support by means of a clamping lever. The support unequivocally determines the position in space of the probe pins with a high degree of accuracy. But again, in the case of this instrument, replacement of probe heads is effected by an operator, who must actuate the clamping lever. There is also the disadvantage that, as a result of changing the complete probe head, a large number of different electrical connections to the measurement machine must be interrupted.

West German Gebrauchsmuster No. 7,400,071 discloses a probe head wherein a probe pin is removably secured to the probe head by means of several permanent magnets. Here, the magnet attachment serves to protect against collision damage. When the pin falls off, in the case of an excessive load, the pin must be reinserted by hand. This solution is not suitable for effecting an automatic change of the probe pin.

BRIEF STATEMENT OF THE INVENTION

The object of the present invention is to provide a receiver or chuck for the interchangeable attachment of a probe pin or probe-pin combination in such manner as to permit a change that is automatically controlled from the machine.

This object is achieved by providing an electrically operated clamping device which draws the connecting member of a probe pin or probe-pin combination against a support which unequivocally determines its position in the receiver of the probe head.

Actuation of the electromagnetic clamping device can be effected automatically by a computer which controls the path of probe-head movement in the measuring machine and the detection of the measurement value. The computer need merely be so programmed that it brings the probe head of the machine to a magazine, which illustratively is provided at a margin of the measurement region and in which different probe pins or probe-pin combinations are stored; the program causes the clamping device to deposit, in the magazine, probe-pin combinations which are no longer required and/or to pick up a new probe-pin combination. Thus, in a probe-pin change, all manual operations are eliminated.

With sufficiently large dimensioning of the support against which the connecting member is drawn, it is in most cases possible to dispense with calibration of the probe ball after introducing a new probe-pin combination, such calibration being necessary only at longer intervals, i.e., probe-pin calibration is not necessary after each change. As a result, measurement time is saved.

The clamping device may illustratively comprise an electric motor having a self-locking transmission which draws the probe pin against its support. In the simplest case, this transmission consists of a threaded spindle on the axis of the motor, the spindle being engaged to a corresponding mating thread in the connecting member.

However, it is particularly advantageous if the clamping device comprises a permanent magnet and an electromagnet, wherein the field of the electromagnet can be superposed on the field of the permanent magnet. With this embodiment, the number of moving parts is minimized and nevertheless the receiver, as in the case of the embodiment involving a motor with self-locking transmission, does not consume any current during intervals between changes.

The permanent magnet is advisedly displaceable against spring force in the direction toward the support for the probe pin. By means of this spring, a reliable separation of the probe pin from the probe head is assured at all times, so that the danger of "sticking" due to an imperfectly compensated or compensatable residual magnet field is avoided.

It is advisable to install the clamping device in the receiver of the probe head, since then only one clamping device is required for each measuring instrument. However, it is also possible to install the clamping device in the connecting member of the probe pin as long as reliable electric switching of the clamping device is assured by the provision of protruding contacts and of corresponding mating contacts on the involved probe-pin magazine. It is also possible to arrange only the permanent magnet or transmission in the connecting member and to associate the electromagnet or motor with the magazine.

The support of the probe head preferably consists of three cylindrical bodies, and the mating support on the probe-pin side comprises three pairs of balls which nest (via their V-shaped spaces) against the cylindrical bodies. By means of such an arrangement, which is already well known to establish the connection point (Knickstelle) for probe heads, the position of the probe-pin combination relative to the coordinate system of the measuring instrument, is clearly determined within an angle of 120°. In order to assure lack of ambiguity over the entire angular range of 360°, an off-axis groove (or locating pin) can be provided in the support, this groove enables angularly unambiguous reception of an off-axis locating pin (or groove) on the connecting member of the probe-pin combination.

The receiver or chuck of the invention is suitable (a) for switch-type probe heads which produce a pulse-like signal when contact is made and (b) for probe heads of the so-called measuring type which contain measurement-value transmitters which, starting from a zero or reference position, supply a signal proportional to the deflection of the movable probe-head part. Probe heads of the last-mentioned type, such as, for instance, the probe device described in U.S. Pat. No. 3,869,799, as a rule include motorized weight balancing to equalize deflections of the probe chuck after insertion of probe-pin combinations of different weight or weight distribution. With the present invention, it is advisable to provide within the probe chuck a switch which signals the presence of a correctly inserted probe pin and which electrically certifies correct reception of the probe pin, the operation of said switch being an interlock function for controlling automatic weight equalization of the probe head.

The connecting member of the probe-pin combination advantageously consists of two parts which are relatively rotatable and can be locked in position, so that the probe-pin combination can be rotated into any desired angular position, as dictated by the workpiece and the specific measurement task.

DETAILED DESCRIPTION

The invention will be illustratively described for two embodiments, in conjunction with the accompanying drawings, in which:

FIG. 5 is a perspective view of a magazine adapted to store probe-pin carriers of the embodiment of FIG. 1.

Figure 1A:
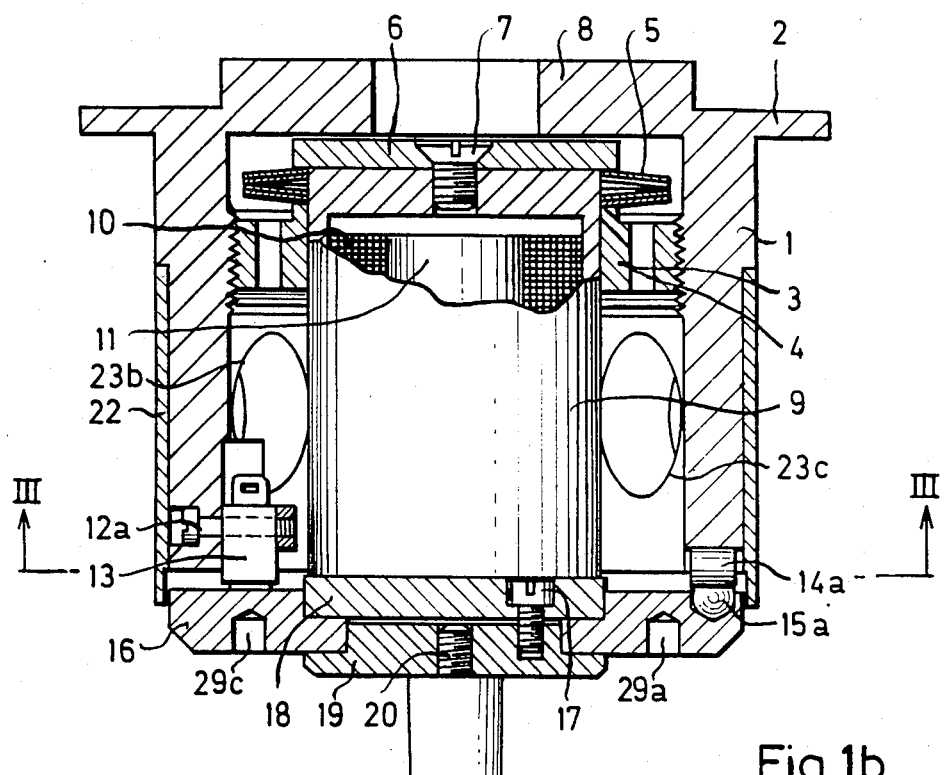
FIG. 1a is a first longitudinal sectional view through a first embodiment, taken along the line I—I of FIG. 3.
Figure 1B:
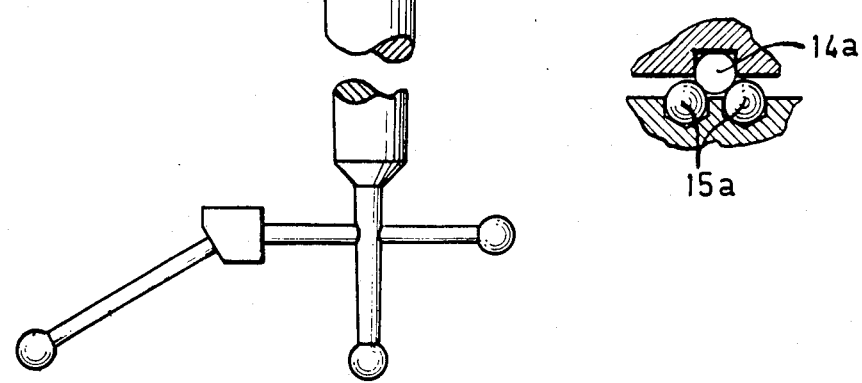
FIG. 1b is a fragmentary detail of one of the three groups of bearings (14/15) of FIGS. 1a and 3.
Figure 2:
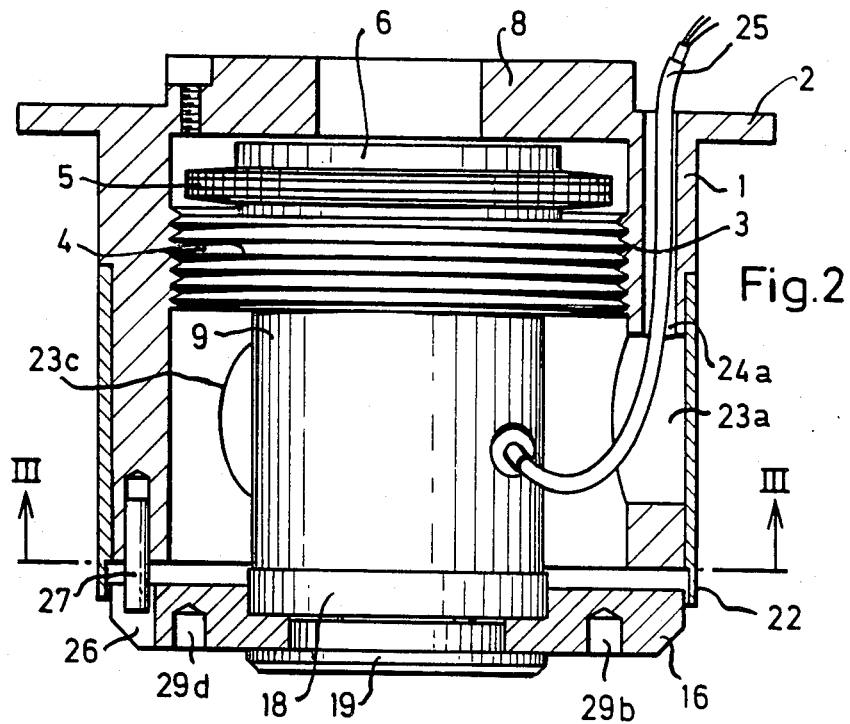
FIG. 2 is a second longitudinal section through the embodiment of FIG. 1, in a 90°-displaced plane indicated by the line II—II of FIG. 3.
Figure 3:
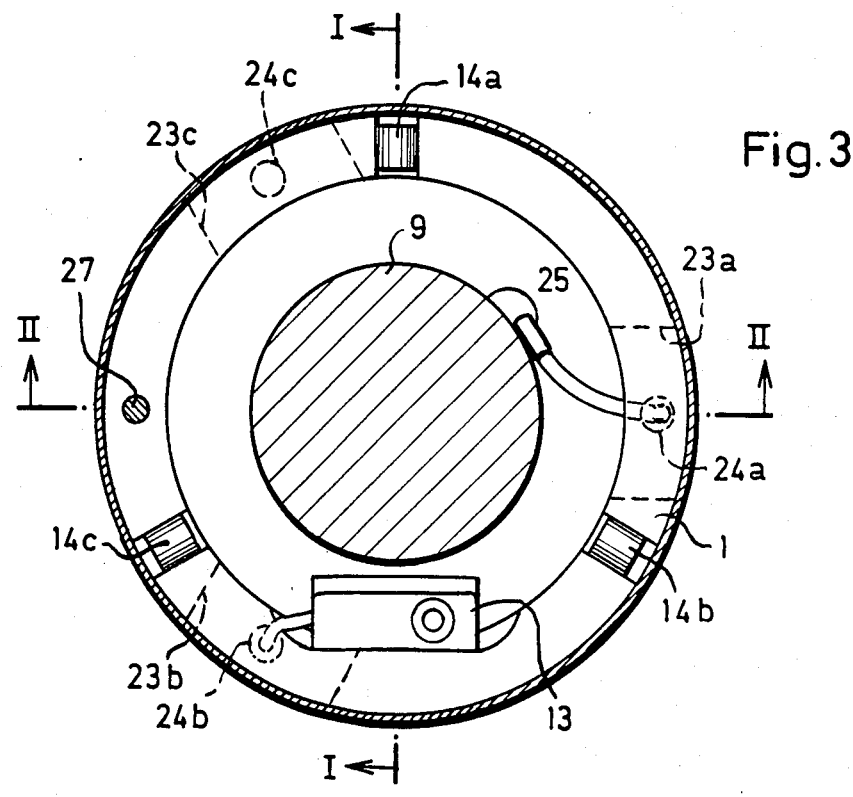
FIG. 3 is a transverse section, taken at line III—III of FIG. 1 and FIG. 2, with the probepin carrier removed.

In FIGS. 1 to 3, the receiver or chuck for a probe-pin combination 21 comprises a cylindrical housing 1 having a flange 2 via which housing 1 is mounted to the deflectable part of a probe head (not shown), as for example to the part 1 of the probe head described in U.S. Pat. No. 3,869,799.

An annular ring 3 has threaded engagement to the bore of housing 1, and ring 3 engages one end of a set of cup springs (Belleville washers) 5. This set of springs 5 is preloaded to urge a retaining plate 6 in the direction toward the upper housing wall 8 of the receiver 1.

The housing 9 of a structural unit consisting of an electromagnet 10 and a permanent magnet 11 is secured to plate 6 by means of a screw 7.

As can be noted from FIGS. 1a, 2 and 3, housing 1 has three radial openings 23a, b and c which are covered by a sleeve 22. A bore 24a extends to opening 23a, from the upper end 8 of housing 1. Bore 24a accommodates connecting cable 25 for electromagnet 10, and cable 25 will be understood to be connected to controls of the measurement machine via the probe head (not shown).

At its lower end, the receiver housing 1 includes probe-supporting means comprising three cylindrical bodies 14a, 14b and 14c which are arranged within the wall of the housing and are located 120° apart. The radially oriented arrangement of these cylindrical bodies can be noted from FIG. 3. A ring 16 has referencing engagement to said supporting means via three pairs of circumferentially spaced balls 15a, b, c; as shown in FIG. 1a for the engaged support elements 14a/15a, each pair of balls forms a V-shaped groove for nested location of a cylindrical body 14. In addition a pin 27 carried by housing 1 engages within a local cutout 26 of ring 16, thus unequivocally determining the spatial position of ring 16 relative to receiver 1 (which is connected to the probe head); pin 27 will be understood to assure the unequivocal character of the seating of ring over the entire circular circumference of 360°.

A first or upper circular plate 18 is seated in a counterbore of ring 16, and a flanged second or lower plate 19 is located to the underside of ring 16, being secured to plate 18 by three screws 17. The second plate 19 has a central thread 20 into which the probe-pin combination 21 is removably engaged. Ring 16 is clamped by the two plates 18 and 19 upon the setting of screws 17, thus securely connecting the probe-pin combination 21 to ring 16. By loosening of screws 17, plates 18 and 19 can be rotated with respect to ring 16, thus enabling angular adjustment of a generally asymmetrical probe-pin combination 21.

The plates 18 and 19, the ring 16 and the pairs of balls 15 form the connecting member of the probe-pin combination. Plate 18 is made of steel, so that the connecting member is drawn by the permanent magnet 11 against the cylindrical bodies of the supporting means 14a, b, c. For an automatically controlled probe-pin change, the electromagnet 10 is so energized by direct current as to produce an additional magnetic field of magnitude approximating but directionally opposed to that of permanent magnet 11, so that the net resultant field is substantially zero. In this circumstance, the holding force between magnet 10 and plate 18 disappears, and the spring 5 presses the magnet combination 9 upward until the plate 6 abuts the upper end 8 of the housing. The involved displacement of the structural part 9 develops a gap between plate 18 and the upper end of magnet 11; the axial extent of this gap corresponds to the distance shown in FIGS. 1a and 2 between the plate 6 and the housing cover 8. The connecting member (16-17-18-19), together with the probe-pin combination mounted thereto, then drops out of the supporting means by its own weight, and is stored in one of the holders of the magazine shown in FIG. 5 for example.

Another probe-pin combination provided with a similar connecting member can then be removed from such a magazine when the measurement machine, under the control of a suitable program, moves the receiver 1 (mounted to the probe head) to another magazine location and positions it above the connecting member of the desired probe-pin combination. Removal of the combination from the magazine can be effected, in principle, without actuation of the electromagnet 10, since the connecting member is automatically drawn against its supporting means, upon sufficient approach of the permanent magnet 11, depending upon the weight of the combination. It is advisable, however, to more positively effect removal of the combination from the magazine by also energizing the electromagnet 10 with such polarity that its field reinforces the field of the permanent magnet 11; this assures a dependable take up of the combination, for even larger gap widths between plate 18 and the magnet 11. It will be understood that upon take up of a new combination (with probe-pin) from the magazine, the structural part 9 (with plate 6) is drawn downward against action of spring set 5 and into the axial offset from the upper end 8 of the housing, as shown in FIG. 1a.

A microswitch 13 is shown mounted by two screws 12a, 12b, to the lower edge of the bore of housing 1. This microswitch is actuated by ring 16 as soon as the latter engages the supporting means 14. Automatic weight compensation of the probe head, as described in U.S. Pat. No. 3,869,799, can therefore be initiated by switch 19, the connecting cable for microswitch 19 being shown passing through bore 24b (FIG. 3).

Figure 4:
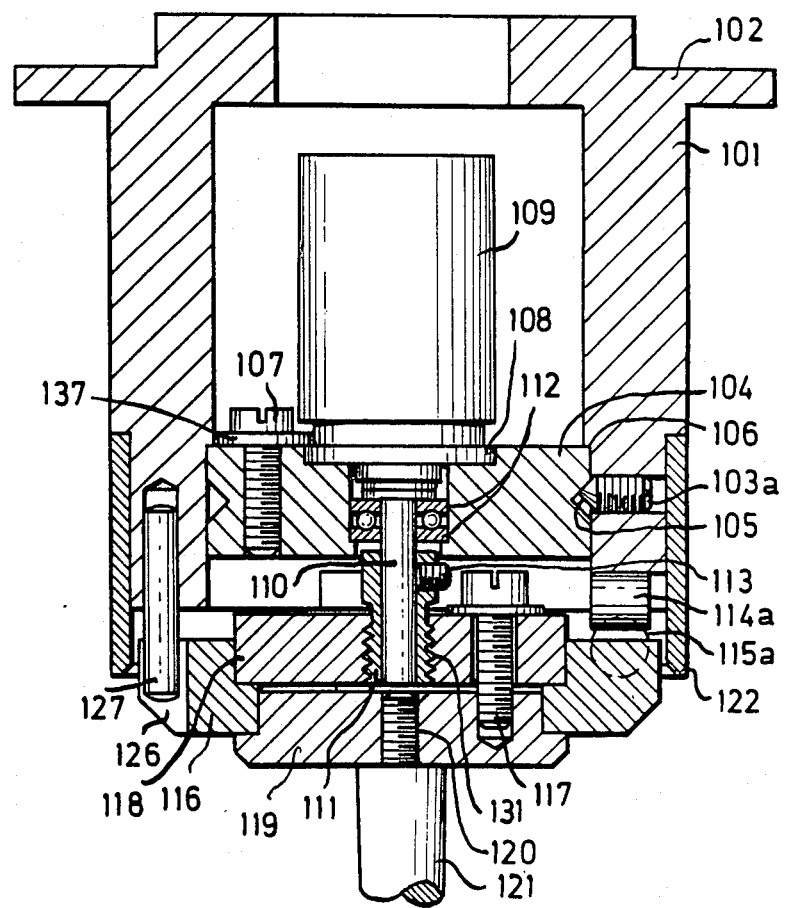
FIG. 4 is a view similar to FIG. 1, for a second embodiment of the invention.

FIG. 4 shows another embodiment of a receiver or chuck for the replaceable attachment of a probe-pin combination. This receiver again consists of a cylindrical housing 101 provided with a flange 102. By means of the flange 102 the receiver can be fastened, for example, to the movable part 3 of the probe head described in U.S. Pat. No. 4,177,568. On the bottom of the housing are three cylindrical bodies 114 which form the supporting means for a connecting member comprising a ring 116, pairs of balls 115, and plates 118 and 119. A probe-pin combination 121 (not fully shown) can be securely engaged to plate 119 via thread 120. As in the previous embodiment, the plates 118 and 119 are connected to each other by three screws 117 and, after the loosening of said screws, plates 118-119 can be rotated with respect to ring 116. In this case also, a pin 127 in the housing 1 serves, in combination with a cutout 126 in ring 116, for the unequivocal orientation of the position of ring 116 with respect to the probe head.

In contrast to the embodiment shown in FIGS. 1 to 3, the connecting member 115-116-117-118-119 of FIG. 4 is drawn against the supporting means 114 not by a permanent magnet but, rather, by a threaded spindle 111, with the aid of an electric motor 109. For this purpose, plate 118 is provided with a concentric mating thread 131 engaged to spindle 111.

The housing of the electric motor 109 has an annular collar 108 and is fastened, by means of three screws 107 and clamp washers which clamp said collar to a support ring 104. Seated in this support ring 104 is a thrust bearing 112 for relieving the shaft 110 of motor 109. A set screw 113 secures the threaded spindle 111 to the motor shaft 110. Support ring 104 and the motor 109 mounted thereto will be seen as a completely assembled unit inserted into housing 101. And the support ring 104 is fixed in housing 101 by three stud bolts 103 having conical ends to locate against the upper flank of a V-shaped annular groove 105, thus pressing the support ring 104 against the locating rim 106 of a counterbore within housing 101. The threaded bores for bolts 103 are covered by a sleeve 122.

Upon a change of the probe-pin combination, motor 109 will be understood to be activated by the program control of the measurement machine, to drive spindle 111 out of engagement with the thread 131 of plate 118. After suitably controlled repositioning of the probe head and reversal of the direction of rotation of motor 109, the motor-driven spindle engages and draws another connecting plate (having a different probe-pin combination) against the supporting means 114. Motor 109 is disconnected by an electronic control system (not shown) when a predetermined torque has been reached, thus determining the force of application of ring 116 and its pairs of balls 115 against the supporting means 114. The thread pitch of spindle 111 is preferably small, so that selflocking occurs, whereby the probe-pin combination remains fastened in the receiver 1 with constant holding force even when the motor is no longer energized.

The isostatic three-point supports (14/15 and 114/115) in the two embodiments of FIGS. 1 to 3 and FIG. 4 determine the position in space of the probe-pin combination relative to the probe head with such a high precision of reproducibility that it is possible to dispense with a separate calibrating process after changes of probe-pin combination. This being the case, the workpiece to be measured can be immediately contacted by a newly mounted probe-pin combination whose geometry (relative to the machine coordinate system) is stored in the computer. This leads to a considerable reduction in measurement time, particularly in measurement jobs which require frequent probe replacement.

The magazine shown in FIG. 5 consists of several holder-plates slidably mounted to a rail 30. Two of these plates, designated 31 and 41, are shown in the drawing. These holder-plates 31 and 41 are adapted to store probe-pin combinations for the holding device shown in FIG. 1a to FIG. 3.

Holder-plates 31 and 41 are provided with fork like recesses 37 and 47, respectively, enabling horizontal movement of the probe-pin combinations to their storing place at plates 31 and 41.

Additional cover plates 33 and 44 are pivotably mounted to holder-plates 37 and 47, the pivot axes being designated 32 and 42. Plates 33 and 44 cover the support side of the connecting member 15-16-17-18-19 of stored probe-pin combinations from dust exposure, thereby preventing a midadjusted attachment of probe-pin 21 and the probe head. The bottom surfaces of cover plates 33 and 44 carry velvet layers 34 and 43. These layers 34 and 43 serve to smoothly clean support members 15a in the course of pivoted displacement of cover plates 33 and 44 about their axes 32 and 42.

Under "normal" conditions, during the measuring procedure between probe-pin changes, cover plates 33 and 44 are biased into the position shown for plate 33 by a spring (not shown). If a probe-pin is stored in recess 37 of plate 31, its support side also would be covered by velvet layer 34 of plate 33.

A single block 35 (45) is fixedly mounted to the upper side of each plate 33 (44). When the probe head is to be provided with a probe pin stored in the magazine, the probe head is driven by the measuring machine, under computer control, against one of these blocks 35 or 45, thereby causing the involved plate 33 (44) to pivot and thus to be removed from the support end of the involved probe pin. At this juncture, electrical excitation of electromagnet 10 of the receiver or chuck of FIG. 1a is operative to automatically take the probe pin from its holder plate.

A magnet 36 (46) on each of the holder plates 31 (41) enables magnet-retention of the open condition of recesses 37 (47) when one or more of the plates 33 (44) is retracted, so that unobstructed access is available for the measuring machine to establish and store spatial coordinates applicable to the probed recess 37 (or 47). It will be understood that such measurement is necessary when the magazine has just been installed with respect to the measuring machine, so that stored data as to each recess 37 (47) can then be available for subsequent program-controlled storage or pick-up of the probe pins.

What is claimed is:

1. In combination, a measuring machine having a well defined working area; a probe head mounted to said measuring machine and carrying an exchangeably mounted probe-pin combination, said probe-pin combination being provided with a connecting member; a reference support in said probe head and an electrically operated clamping device adapted to draw said connecting member against said reference support; and a magazine arranged in the working area of the measuring machine for machine-controlled storage of said probe-pin combination and for similar storage of a plurality of different probe pin combinations each of which has a similar connecting member, said magazine having a plurality of individual holders each of which is adapted to hold a different one of said probe-pin combinations, said magazine having a separate movable cover for each of said holders for protection of each stored probe-pin combination, and movement of said covers being machine-controlled in the course of a machine-controlled exchange of a given probe-pin combination with respect to its head-mounted and magazine-stored relationships.

2. In combination, probing means having a separably attachable support side, a measuring device for the interchangeable attachment of said probing means via the support side thereof, a working area within which thus-attached probing means can be positioned for contacting a workpiece to be checked, a magazine arranged in the working area for machine-controlled storage of plural different probing means, said magazine having a plurality of holders each of which is adapted to hold a different one of said probing means with its attachable support side oriented for attachment when said holding device is moved to attachment relation with a selected one of said plural probing means, and a plurality of movable cover plates associated with said magazine, there being one cover plate for each of said holders for protecting the support side of each of the probing means stored in said magazine.

3. A measuring machine according to claim 2, wherein the cover plates of said magazine are biased into a first position protecting the support side of said probing means, and are adapted to be moved by said movable part of the machine.

4. A measuring machine according to claim 2, in which the holders of said magazine have fork-shaped recesses which are adapted to engage and retain said probing means.

5. A measuring machine according to claim 2, in which each of the cover plates of said magazine is pivotably mounted to an associated one of said holders.

6. A magazine for machine-controlled storage of a plurality of probing means each of which has a support side that is separably attachable to a movable part of a coordinatemeasuring machine having a working area, said magazine being arranged in the working area and having a plurality of holders each of which is adapted to retain a magazine-stored one of said probing means, and a movable cover plate mounted to each holder to protect the support side of a stored one of said probing means.

7. A magazine according to claim 6, in which said cover plates are adapted to be moved by the movable part of said measuring machine.

* * * * *